United States Patent
Küpper et al.

(10) Patent No.: US 9,415,937 B2
(45) Date of Patent: Aug. 16, 2016

(54) ROLLER COMPRISING AN EDDY CURRENT BRAKE

(71) Applicant: Interroll Holding AG, Sant' Antonino (CH)

(72) Inventors: Gerd Küpper, Bad Salzuflen (DE); Dirk Jostes, Bielefeld (DE)

(73) Assignee: Interroll Holding AG, Sant'Antonino (CH)

( * ) Notice: Subject to any disclaimer, the term of this patent is extended or adjusted under 35 U.S.C. 154(b) by 0 days.

(21) Appl. No.: 14/421,575

(22) PCT Filed: Jul. 18, 2013

(86) PCT No.: PCT/EP2013/002134
§ 371 (c)(1),
(2) Date: Feb. 13, 2015

(87) PCT Pub. No.: WO2015/007299
PCT Pub. Date: Jan. 22, 2015

(65) Prior Publication Data
US 2016/0145046 A1    May 26, 2016

(51) Int. Cl.
*B65G 13/075*    (2006.01)
(52) U.S. Cl.
CPC .................................. *B65G 13/075* (2013.01)
(58) Field of Classification Search
CPC .................................................... B65G 13/075
USPC ....................................................... 198/35 A
See application file for complete search history.

(56) References Cited

U.S. PATENT DOCUMENTS

| | | | | | |
|---|---|---|---|---|---|
| 3,352,397 | A * | 11/1967 | Klaus Becker | ........ | B65G 9/006 193/35 A |
| 6,527,097 | B2 * | 3/2003 | Dreyer | .................... | B65G 43/06 193/35 A |
| 8,607,965 | B2 * | 12/2013 | Sejourne | .............. | B65G 13/075 193/35 A |
| 8,887,898 | B2 * | 11/2014 | Sejourne | .............. | B65G 13/075 193/35 A |
| 2002/0134643 | A1 * | 9/2002 | Schmale | .............. | B65G 13/075 193/37 |
| 2007/0256908 | A1 * | 11/2007 | Yazaki | ..................... | B65G 1/08 193/35 A |

FOREIGN PATENT DOCUMENTS

| | | |
|---|---|---|
| DE | 2821973 A1 | 11/1978 |
| EP | 1243528 A1 | 9/2002 |
| NL | 1021991 C2 | 5/2004 |

OTHER PUBLICATIONS

Europa Lehrmittel, Elektronik Industrie-, Rundfunk-, Fernsehelektronik, 1. Teil: Grundlagen-Elektronik, pp. 73-75, 96-97, 1969.

* cited by examiner

*Primary Examiner* — Mark A Deuble
(74) *Attorney, Agent, or Firm* — Richard M. Goldberg

(57) ABSTRACT

A roller with an eddy current brake includes a roller shell that is rotatably supported in a stationary bearing, wherein the eddy current brake, within the roller shell, includes an eddy current receiver connected thereto and a stationary magnet. The eddy current brake is formed with a shielding tube made of a ferromagnetic material (steel), which at one end is fixedly connected with a carrier with the rod, the carrier being made of a non-magnetizable material (aluminum), wherein the shielding tube is arranged at a distance of a further air gap from the roller shell and at a distance of a further air gap from the eddy current receiver. By reason of the roller 5, one achieves that the start of the rotation of the roller shell 11 takes place without remagnitization and thus more smoothly.

10 Claims, 2 Drawing Sheets

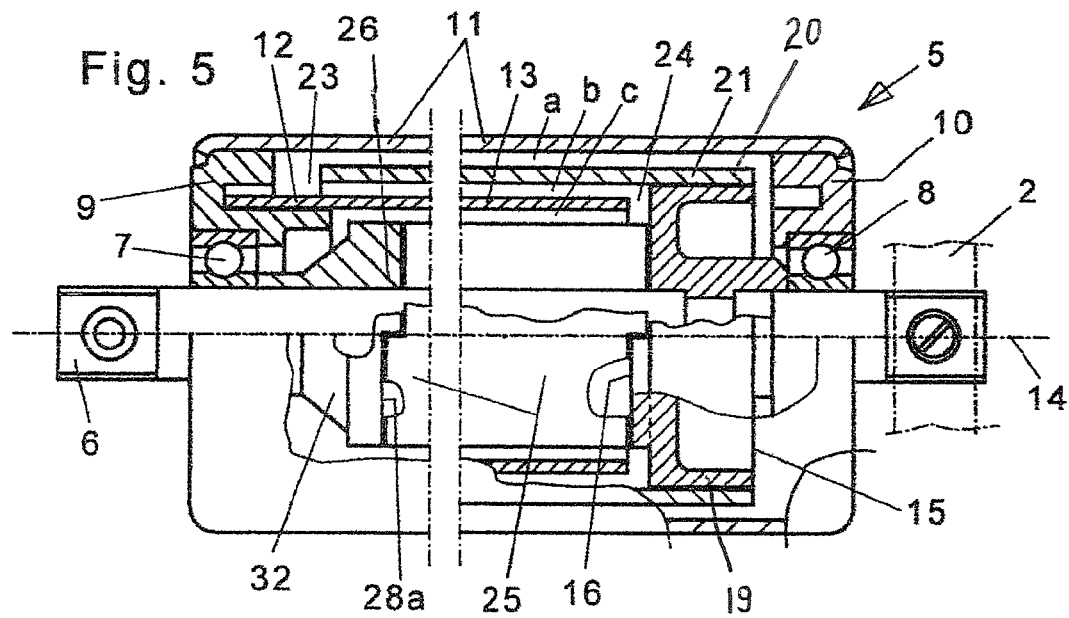
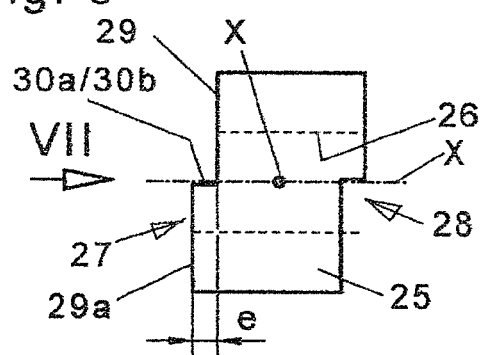
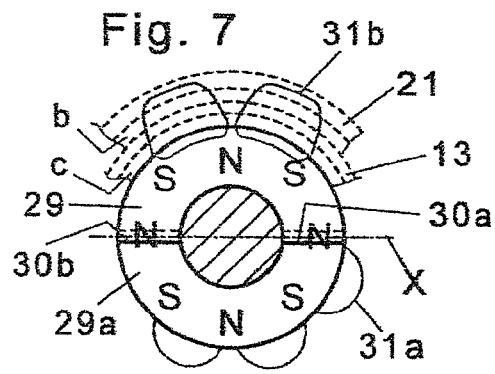
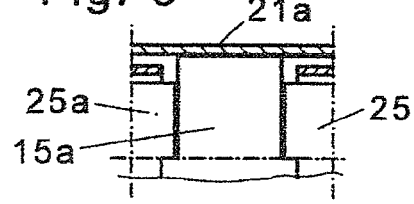
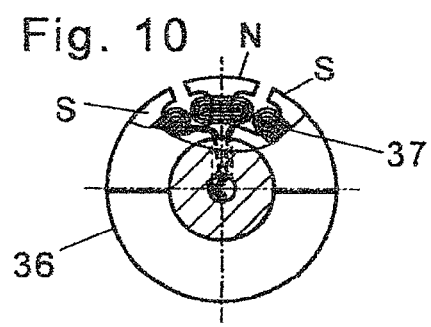
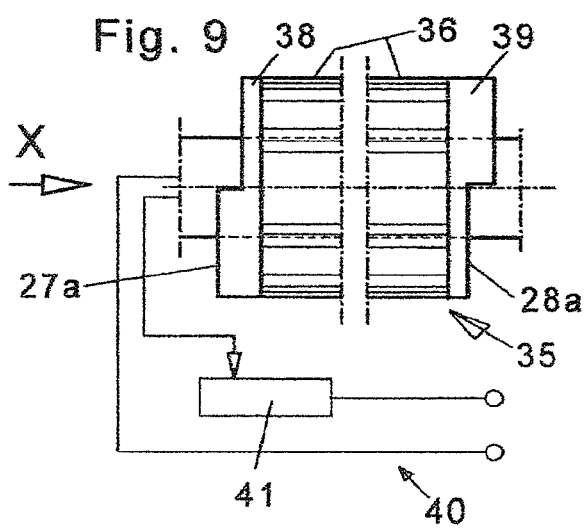

ROLLER COMPRISING AN EDDY CURRENT BRAKE

BACKGROUND OF THE INVENTION

The invention relates to a roller with an eddy current brake.

Such a roller is known from EP 1 243 528 A1, said roller having a brake device in the form of an eddy current brake in the interior of an outer tube. To this end, the outer tube, i.e. the roller shell, is formed with an insert body of electrically conductive material, such as copper or aluminium, on the inner surface thereof. The roller shell is rotatably supported on a rod, which is fixed in a stationary frame. Fixedly arranged permanent magnets with poles are arranged on the rod, which are located at a distance of an air gap to the insert body. In the case of a rotation of the roller shell together with the insert body relative to the stationary poles, eddy currents are induced in the insert body by the magnetic field, said currents opposing braking torque to the rotational movement of the roller shell, which increases as the speed increases.

To this, hereinafter referred to as the first braking torque, a second braking torque is added when the magnetic field also causes eddy currents in the roller shell that is made of electrically conductive, non-magnetizable material, such as aluminum or stainless steel. If the roll shell is further made of magnetizable material, such as steel, there is a further effect of the magnetic field on the roller shell due to its rotation about the stationary magnetic field to a constant remagnetization, whereby a third braking torque occurs.

Such a roller is used on a roller conveyor, which is equipped with a plurality of rollers without any braking device and extends with a slightly inclined conveyor path. Conveyed goods, which are placed thereon, are conveyed without any further drive by the downhill-slope force caused by the dead weight. During the operation of such roller conveyors, the conveyed goods may come to a standstill for various reasons, so that the conveyed goods pile up without free space between individual conveyed articles. As soon as the further transport of the conveyed goods starts again, it is required that the conveyed goods automatically start to move again on the inclined conveyor path. The explained situation involves the difficulty of, on the one hand, achieving automatic rolling-off of the conveyed goods on the roller conveyor by means of the inclined conveyor path, and, on the other hand, avoiding that the conveyed goods assumes an inappropriate greater speed. To control the speed of conveyed goods, it is known to use rollers with integrated brakes of mechanical or electrical type, similar to an electric motor, or as eddy current brakes at suitable positions in the roller conveyor.

When the known roller with an eddy current brake is used, it must be taken into account that an automatic movement of previously stopped conveyed goods can only be achieved by accepting a greater inclination of the conveyor path, from which, in turn, greater energy must be absorbed when conveyed goods pile up.

DE 28 21 973 A1 discloses a magnetic torque coupling in which eddy currents as a result of relative movements of stationary permanent magnets to an eddy current support and also remagnetization of components are used for a desired torque transmission. The document is only of interest with regard to the cup-shaped coupling parts.

With regard to the prior art on permanent magnets, magnetism, and eddy current brakes, reference is made to the textbook "Europa-Lehrmittel, ELEKTRONIK, 1. Teil: Grundlagen-Elektronik 3. Auflage", pages 73 to 75 and pages 96 and 97.

SUMMARY OF THE INVENTION

It is the object of the invention to provide an embodiment of the known roller with an eddy current brake, which can be produced at low cost, opposes the smallest possible resistance to piling-up of the roller, and increases the effectiveness of the eddy current brake.

In the roller according to the preamble of claim 1, this problem is solved by the characterizing features thereof. The configuration of the eddy current brake with a fixed shielding tube of a ferromagnetic material, which is immobile relative to the stationary magnetic field, has the effect that, on the one hand, a braking torque as a result of continuous remagnetization is eliminated and, on the other hand, the magnetic field emanating from the permanent magnet is only used for the eddy current brake. The result is that the opposing braking torque of the value zero at the beginning of a rotation of the roller shell increases due to the beginning rotation with the effect of the eddy current. Thus, the start of the roller shell is facilitated.

Another advantage arises from the fact that with the ferromagnetic shielding tube the roller, regardless of the material used for the roller shell, propagation of magnetic emission is prevented.

Finally, the arrangement of the shielding tube has the further advantage that, except for certain strength requirements, no requirements concerning the material of the roller shell must be met. This results in advantages for a low-inertia roller shell that can be manufactured at low cost, as can be achieved for example by the use of plastics.

The features of the dependent claims are advantageous embodiments. This results in an advantageous use of space and further design possibilities for the magnet. A cost-saving and compact design is achieved. The features enable to adapt the braking torque of eddy current brake to the application conditions.

BRIEF DESCRIPTION OF THE DRAWINGS

Other features, advantages, and details of the invention will become apparent from the following description of embodiments with reference to the drawings, which show:

FIG. 5 a half-sectional view of the embodied roller,

FIG. 6 a component of the roller according to FIG. 5,

FIG. 7 a view of the component in the direction of the arrow of vision VII in FIG. 6, FIG. 8 a section of an embodiment of components according to FIG. 5 on a smaller scale, FIG. 9 an embodiment of the magnet as an electromagnet in a view corresponding to FIG. 5, and FIG. 10 a view on an end face of the electromagnet according to the arrow of vision X in FIG. 9.

DETAILED DESCRIPTION

Figure 1:
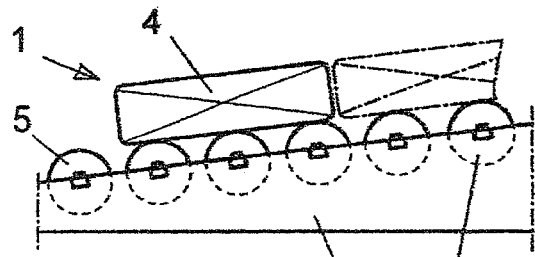
FIG. 1 a roller conveyor with conveyed goods.

FIG. 1 illustrates a roller conveyor 1 with a stationary frame 2, on which a plurality of rollers 3 forming an inclined conveyor path is fixedly arranged. The rollers 3 are designed in a free way without a drive or a brake, and they support conveyed goods 4 lying thereon, which strive to roll down the conveyor path owing to their weight. Moreover, a roller 5 with an eddy current brake according to the invention is arranged on the roller conveyor 1.

Figure 2:
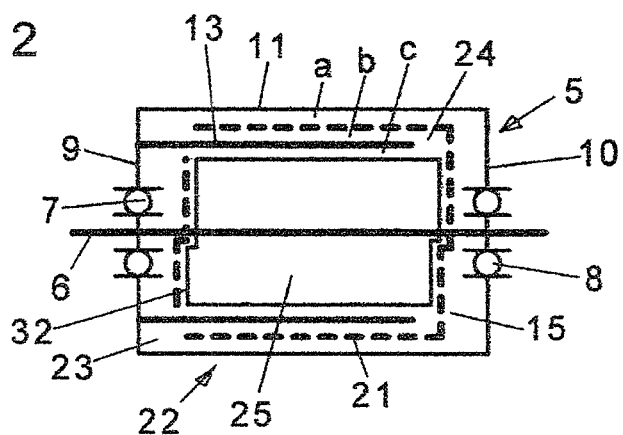
FIG. 2 a schematic illustration of the roller of an embodiment 1.

The embodiment 1 (FIGS. 2 and 5) with the roller 5 comprises a rod 6, which is fixed on the stationary frame 2, bearings 7, 8 in the form of groove ball bearings being accommodated thereon. The outer rings thereof are accommodated in covers 9, 10 with a tight fit. According to FIG. 5, the rod 6 is axially and radially fastened in the frame 2 by a threaded connection (not shown).

The covers 9, 10 are fixedly pressed together with ends of a tubular roller shell 11. An end 12 of a tube is fixed on the cover 9 in a concentric arrangement with the rod 6 and the roller shell 11. In the following, the tube will be referred to as an eddy current receiver 13. An axis 14 extends through the rod 6.

The free end of the eddy current receiver 13 extends up to the vicinity of a carrier 15 that is united with the rod 6 to form one component. To this end, the carrier 15 is formed as a die casting of non-magnetizable material, such as an aluminum-zinc alloy, and the rod 6 is comprised in a way fixed against rotation and positively. On an end face 16, the carrier 15 is formed with two end face halves, which are axially displaced to one another, and with two diametrically extending faces connecting them. For details of the end face 16, reference is made to the end face of a permanent magnet, which will be described in the following.

Moreover, the carrier 15 is provided with a cylindrical shell 19, which is formed to be concentric with the axis 14 and on which an end 20 of a shielding tube 21 of ferromagnetic material, such as steel, is formed. The roller shell 11, the shielding tube 21, and the eddy current receiver 13 constitute essential components of an eddy current brake 22.

With this arrangement, the inner bore (not designated) of the roller shell 11 and the shell of the eddy current receiver 13 delimit a circular-annular clearance 23 between them. The free end of the shielding tube 21 extends into this clearance up to the vicinity of the cover 9. The wall strength of the shielding tube 21 and the clearance 23 are dimensioned such that two annular air gaps a and b are formed.

Further, a clearance 24 accommodated on the rod 6 is formed between the shielding tube 21 and a permanent magnet 25. The permanent magnet 25 is formed with a bore 26, which enables the permanent magnet 25 to be pushed onto the rod 6 in a way free from play. The clearance 24 is dimensioned such that an annular air gap c is formed between the permanent magnet 25 and the eddy current receiver 13.

The permanent magnet 25 comprises a left end face 27 and a right end face 28. The left end face 27 is formed with two end side halves 29 and 29a, which are offset to each other axially by a distance e and thereby form two flush faces 30, 30a. The right end face 28 is formed in the same way and geometrically corresponds to the end face 27, which is rotated about an axis X in a counterclockwise way by 180 degrees. Moreover, the design of the end face 16 on the carrier 15 corresponds to the design of the left end face 27.

According to FIG. 7, the permanent magnet 15 is magnetized in the form "8-pole, N and S pole alternately outside" wherein the north poles N and the south poles S with respect to the axis X, also with respect to the faces 30, 30a, are aligned symmetrically. The result is that the permanent magnet 25, irrespective of its position, can be brought into abutment with the end face 16 or the end face 27 for abutment on the carrier 15.

Imaginary magnetic field lines appear between the poles N, S. They extend from the north pole N to the south pole S outside the magnet and from the south pole S to the north pole N inside thereof, and form a closed course. Depending on their surroundings, the field lines take different courses through air or through ferromagnetic material. In FIG. 7, a field line 31a exhibits a course through air if no ferromagnetic material is close by. By contrast, a field line 31b takes a deflected course if ferromagnetic material, such as the shielding tube 21, is close by. Here, the field line 31b extends through the eddy current carrier 13, in which eddy currents thus form. Further, the field line 31b is illustrated as a closed line.

With the configuration of the end face 16 on the carrier 15, the end faces 27, 28 on the permanent magnet 25, and an end face 28a, corresponding to the end face 28, on an end piece 32, one achieves that the permanent magnet 25 is positively fastened to the carrier 15 in an engaging way according to the type of a jaw coupling.

Moreover, axial fastening of the rod 6 to the carrier 15 and the components accommodated thereon, such as the permanent magnet 25 and the end piece 32, through the roller shell is accomplished by means of the covers 9, 10 accommodating the bearings 7, 8.

With regard to the materials used, it is noted that the roller shell 11 is a tube made of an arbitrary material, such as steel, aluminum, or plastics, for example with a wall strength of 2 to 5 millimeters, the shielding tubes 21, 21a are made of a magnetizable material, such as steel of a specific type, with good conductivity for magnetic field lines, and the eddy current receivers 13, 13a are made of an electrically current-conducting, non-magnetizable material, such as copper or aluminum, with a wall thickness of e.g. 3 millimeters.

Figure 3:
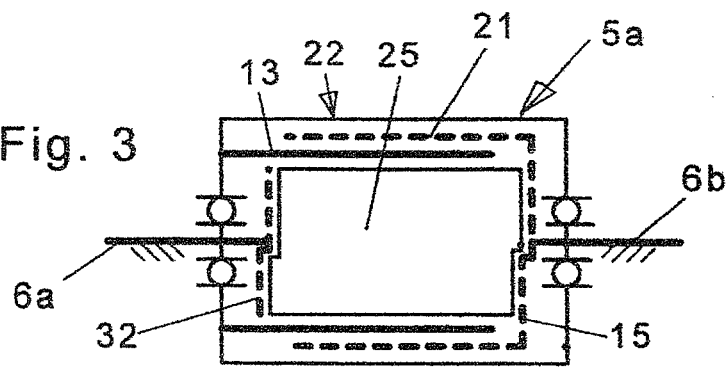
FIG. 3 a schematic illustration of the roller of an embodiment 2.

The embodiment 2 (FIG. 3) comprises a roller 5a, which is constructionally identical with the roller 5, except for the rod 6. Differing from the above, the roller 5a is supported on two rod parts 6a, 6b, which are each fixedly clamped on the frame 2. At their free ends, the rod parts 6a, 6b are fixedly connected to the carrier 15 and the end piece 32, which accommodate the permanent magnet 25 between them.

Figure 4:
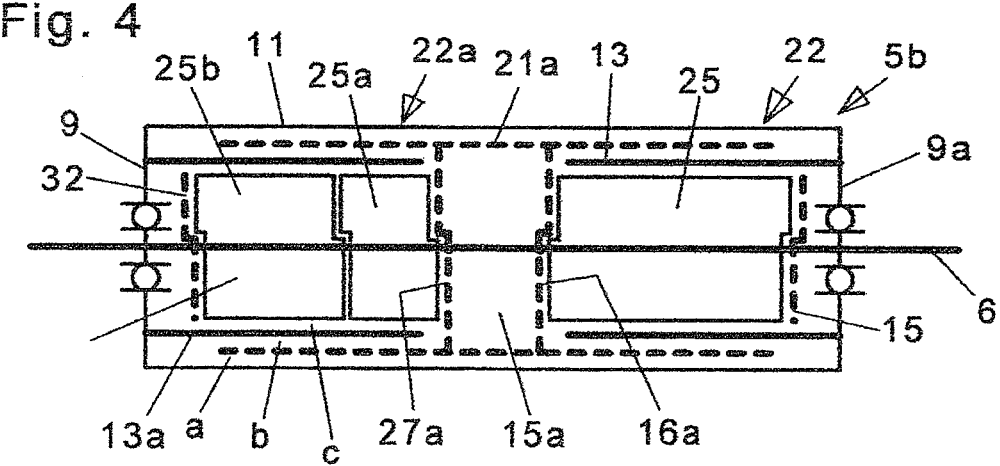
FIG. 4 a schematic illustration of the roller of an embodiment 3.

The embodiment 3 (FIG. 4) comprises a roller 5b. A carrier 15a is fixed against rotation on the rod 6, the end faces 16a and 27a thereof each being formed like the above-mentioned end faces 16 and 27. The carrier 15a is fixedly located on the rod 6 approximately in the middle of the longitudinal extension of the roller shell 11. A shielding tube 21a is fixedly connected to the carrier 15a, said tube corresponding to the above-mentioned shielding tube 21 in terms of diameter and material. Further, the shielding tube 21a as an integral component extends across the permanent magnets 25, 25a, 25b arranged at the side of the carrier 15a. Said magnets, except for the different lengths of the permanent magnets 25a and 25b, are constructionally identical with the described permanent magnet 25. Just like this magnet, the permanent magnets 25a, 25b are axially fastened on the rod 6 at the end face in a way fixed against rotation, as described. With the permanent magnets 25, 25a, 25b of different lengths, permanent magnets of different strengths are provided, which enable an adjustment of the desired overall braking torque of the eddy current brakes 22 and 22a.

The embodiment 4 (FIGS. 9 and 10) provides an electromagnet 35 instead of the permanent magnet, the dimensions of which corresponding to that of the above-mentioned permanent magnet 25. According to FIG. 10, similar to an electric motor, poles are formed on an armature 36, said poles, due to windings 37 to which direct current is applied, forming north poles N and south poles S of the electromagnet 35, as is known. The armature 36 is closed with covers 38, 39 on the end face thereof. The cover 38 is formed with an end face 27a corresponding to the end face 27, and the cover 39 is formed with an end face 28a corresponding to the end face 28. Direct current is supplied via an electric circuit 40, which comprises a variable resistor 41 for changing the current flowing through the windings 37.

By the configuration of the electromagnet 35 including the end faces 27a, 28a corresponding to the permanent magnet 25, the roller 5 may be equipped with the electromagnet 35 instead of the permanent magnet 25.

The roller 5 functions as follows:

With the conveyed goods 4 lying on the roller 5 at standstill, the roller 5 is in a state in which the roller shell 11 is free from any braking torque. As soon as the obstacle to the movement of the conveyed goods 4 on the roller conveyor 1 has been removed, the downhill-slope force caused by the dead weight of the conveyed goods 4 takes effect and initiates the onward movement of the conveyed goods 4 and thus the rotation of the roller shell 11 together with the eddy current receiver 13. The eddy current receiver 13 thus moves through the magnetic field generated by the permanent magnet 25, so that an induction of eddy current in the eddy current receiver 13 is achieved and braking torque is applied to the roller shell 11. Starting 30 from the standstill of the roller shell 11, the braking torque increases constantly from a value of zero as the speed of the roller shell 11 increases.

As a result of the effect of the stationary shielding tube 21, which is made of magnetic steel, remagnetization, i.e. an impact of the magnetic field also emanating from the stationary permanent magnet 25 on the roller shell, is eliminated. This provides defined conditions, so that no braking toque opposes the movement start of the roller shell 11 at the beginning, but when the speed increases, a constantly increasing braking torque from the eddy current brake opposes. This means that the roller conveyor 1 can be designed with little inclination and piling-up of parts of the conveyed goods 4, which abut one another without gaps therebetween, takes place with low inertial forces as a result of reduced conveying speeds.

The described functioning applies analogously to the embodiments 2 to 4. The embodiment 4 allows to adjust the current applied to the winding of the electromagnet 35 and thus the strength of the braking torque to the specific application of the roller 5 accordingly.

LIST OF REFERENCE NUMERALS 1 roller conveyor
2 frame
3 roller
4 conveyed goods
5 5a, 5b roller with eddy current brake
6 6a, 6b rod
7 bearing
8 dto.
9 9a cover
10 dto.
11 roller shell
12 end
13 13a eddy current receiver
14 axis
15 15a carrier
16 16a end face
17 --
18 --
19 shell
20 end
21 21a shielding tube
22 22a, 22b eddy current brake
23 clearance
24 dto.
25 25a, 25b permanent magnet
26 bore
27 27a left end face
28 right end face
29 29a end face half
30 30a face
31 31a field line
32 end piece
33 --
34 --
35 electromagnet
36 armature
37 winding
38 cover
39 dto.
40 circuit
41 variable resistor
N north pole
S south pole
a air gap
b dto.
c dto.
e distance
X axis

What is claimed is:

1. A roller with an eddy current brake, comprising:
   a tubular roller shell rotatably supported about an axis in a stationary bearing,
   an eddy current brake with a tubular eddy current receiver within the roller shell and fixedly connected thereto,
   a magnet stationarily connected with the bearing, having north and south poles arranged at a distance of an air gap from the eddy current receiver, and
   a shielding tube made of a ferromagnetic steel material formed between the roller shell and the eddy current receiver in a way projecting thereinto,
   the shielding tube being fixedly connected with the stationary bearing at an end thereof,
   the shielding tube being arranged at a distance of a second air gap from the roller shell and at a distance of a third air gap from the eddy current receiver,
   wherein the second and third air gaps are dimensioned sufficiently large so that a contact of the roller shell and of the eddy current receiver with the stationary shielding tube upon performance of the rotation is excluded.

2. The roller according to claim 1, wherein the magnet is positively connected with the stationary bearing at an end face thereof.

3. The roller according to claim 1, wherein the magnet is formed as a permanent magnet.

4. The roller according to claim 1, wherein several magnets are provided.

5. The roller according to claim 1, wherein the axis extends through a stationarily arranged rod.

6. The roller according to claim 5, wherein the rod comprises two separate rod parts, which are coaxially fastened with respect to each other.

7. The roller according to claim 5, wherein there are adjacently arranged eddy current brakes and a common shielding tube, which is fixedly connected with a carrier fixed on at least a part of the rod.

8. The roller according to claim 1, wherein there are two eddy current brakes and the carrier is arranged between the two eddy current brakes.

9. The roller according to claim 1, wherein the magnet is formed as an electromagnet.

10. The roller according to claim 9, wherein the electromagnet is connected with an electric circuit, which comprises a variable resistor.

* * * * *